INVENTORS
DONALD S. EBERHARDT
LOUIS B. GRATZER
JOE N. RUNNELS, JR.
BY Robert W. Beach
ATTORNEY INVENTORS.
DONALD S. EBERHARDT
LOUIS B. GRATZER
JOE N. RUNNELS, JR.
BY Robert W. Beach
ATTORNEY

United States Patent Office 3,347,495
Patented Oct. 17, 1967

3,347,495
AIRPLANE WING FLAP WITH AUGMENTED JET LIFT-INCREASING DEVICE
Donald S. Eberhardt and Louis B. Gratzer, Seattle, and Joe N. Runnels, Jr., Bellevue, Wash., assignors to The Boeing Company, Seattle, Wash., a corporation of Delaware
Filed May 17, 1965, Ser. No. 456,099
15 Claims. (Cl. 244—42)

This invention relates to airplane wing flap installations and particularly such a wing flap which is blanketed by an air jet that substantially increases attachment of the main stream airflow over the upper surface of a flap for the purpose of increasing its lift and consequently its effectiveness in increasing the lift of the wing as a whole. Both theory and experiment show that the increase in lift obtained from jet flow over the flap is directly related to the momentum of such jet flow.

A principal object of the present invention is to provide mechanism for producing a greater momentum of the jet over the flap for a given power extracted from the engines than produced by the use of nozzles alone by increasing the airflow mass.

A further object is to distribute the jet flow over the flap more effectively to minimize the flow required to produce full attachment of the main stream flow. This object is accomplished by spanwise distribution of the jet flow in proportion to the wing chord.

Specifically it is an object to produce the greater mass flow of air over the leading edge of the flap by utilizing ejectors for augmenting the jet flow from the nozzles and to orient the discharge from such ejectors in the most effective relation to the leading edge of the flap.

An additional object is to utilize the flow of air induced by the ejector nozzles for cooling wing and flap parts.

To facilitate the supply of induced air to the ejectors it is an object to draw such air from the lower or high-pressure side of the flap and wing.

Another object is to provide interaction between spoilers and the jet flow over the flaps to produce more effective lateral control.

Another object is to spoil the flow over the flaps during the landing ground roll to reduce the wing lift, thereby placing more load on the landing gear. Termination of the jet flow immediately after touchdown increases the engine power available for thrust reversal. Both the increased load on the landing gear and the higher thrust reversal force increases the braking effectiveness and reduces the airplane roll distance.

In supplying compressed air to the ejector nozzles from jet engines it is an object to provide equal air velocity from all of the nozzles from whatever engines are functioning and to prevent reverse flow of air to any engine which is not functioning.

The foregoing objects can be accomplished by providing a series of ejectors adjacent to the leading edge of an airplane wing flap. The ejectors include a series of jet flow nozzles and channels into which the nozzles project their jets. The high velocity nozzle jet flow induces supplemental airflow which mixes with the jet flow in the channels. Consequently, the resulting airflow has a greater mass and a greater momentum even though the velocity of the air discharged from the ejectors is less than the velocity of the air discharged from the nozzles. The airflow from the ejectors should be directed rearwardly over the flap substantially tangentially to the curvature of the flap's leading edge at the point of discharge from the ejectors. While adequate openings are provided for intake of such supplemental air when the ejectors are in operation, the openings through which such supplemental air is supplied in the lower surface of the wing are closed during cruising flight of the airplane. By supplying alternate nozzles with air from different supply ducts, air will still be supplied along the entire flap generally uniformly even though one duct should fail. By connecting both ducts to all engines airflow to all nozzles can be maintained. Check valves located at each engine supply duct prevent loss of air by reverse flow into any engine which is not in operation.

As larger, heavier and faster airplanes are built the required take-off speed and landing speed tend to increase. For a given size and load capacity of an airplane fuselage 1 the wing 2 is inclined to be of smaller area when the cruising speed of the airplane is higher. Consequently, there is a continual search for expedients by which the take-off speed and the landing speed of such airplanes can be reduced without causing the cruising speed or high speed of the airplane to be reduced correspondingly. A common expedient for reducing take-off speed, and particularly landing speed, has been the provision of flaps 3 on the trailing edges of the wings which can be swung downward through an angle as great as 85 degrees to horizontal to increase greatly the effective camber of the wing and correspondingly improve its lift characteristics.

When the flaps 3 are large or they are swung downward to an excessively great angle or both, they tend to produce separation of the airflow and turbulence, instead of the air flowing smoothly over them, so that their effectiveness in producing lift is impaired. It has been proposed heretofore to project high speed air jets onto the leading edges of such flaps for the purpose of accelerating the boundary layer flow and increasing the attachment of the main stream airflow over such flaps in their deflected positions. In lift control systems using high-speed jets alone, the nozzle airflow required to obtain a given lift is greater than in systems of the ejector type. Consequently, more energy is necessary to achieve a given increase in flap lift in systems using high-speed jets alone. It may be necessary, therefore, for airplanes using jet flow only for increasing flap lift to provide an increase in power available from the main airplane propulsion system, or the addition of an auxiliary power source may be required to supply air to the jet nozzles.

Figure 2:
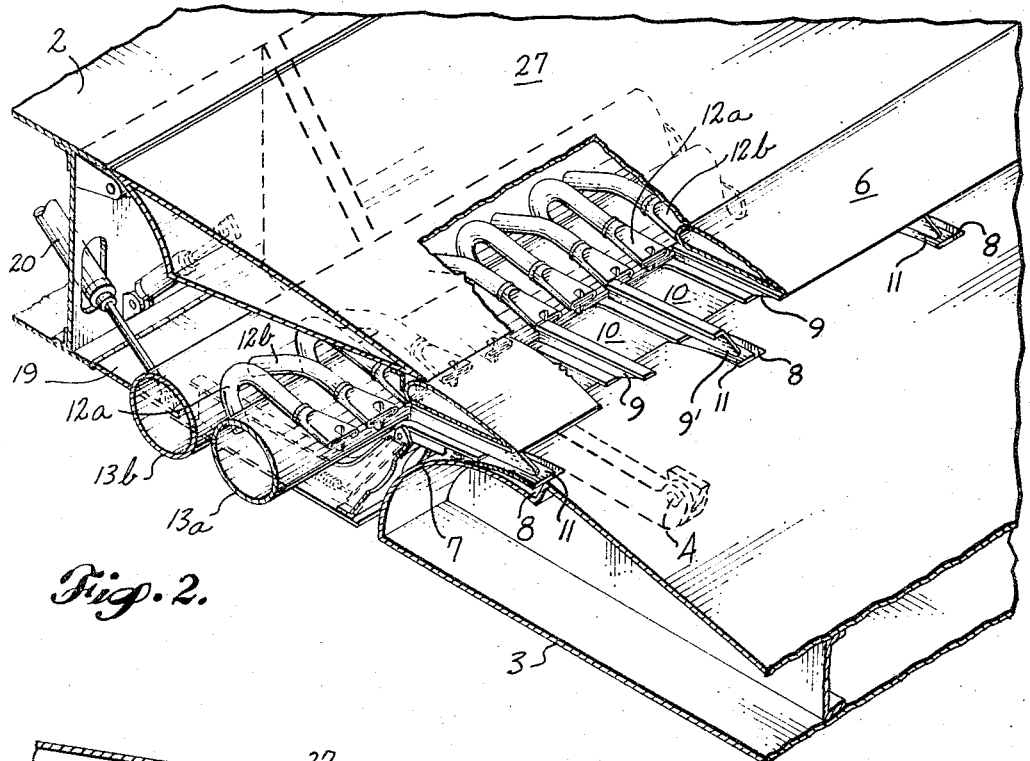
FIGURE 2 is a top perspective of a fragmentary portion of a wing showing the ejector installation, parts being broken away.
Figure 3:
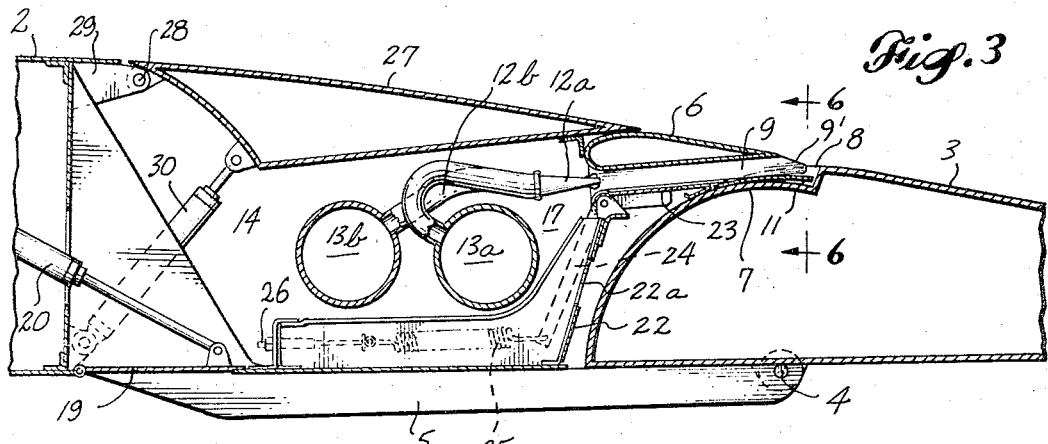
Figure 5:
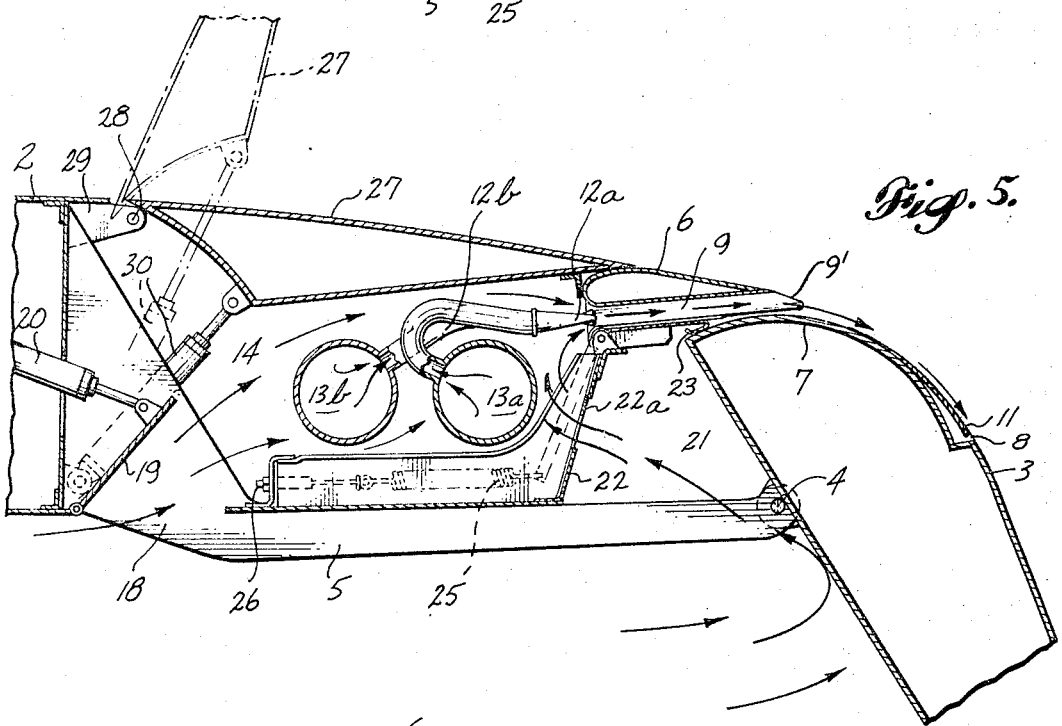
FIGURE 5 is a longitudinal vertical section through a portion of the wing as shown in FIGURE 3 with parts in a different operative relationship.

In the representative installation of flaps 3 on the airplane wing 2 shown in the drawings, the flap can be swung from the position shown in FIGURES 2 and 3, virtually in alignment with the forward portion of the wing, into the downwardly swung or deflected position of FIGURE 5 about pivots 4 carried by the flap-supporting brackets 5 spaced spanwise of the wing at appropriate intervals. When the flap is in its upwardly-swung position of FIGURES 2 and 3, its upper surface is disposed substantially in coplanar relationship to the upper surface of the trailing edge portion of the wing immediately forward of the flap. The major portion of the leading edge 7 of the flap is concentric with the flap pivot 4 so that a constant relationship will be preserved between the leading edge of the flap and the trailing edge of the wing as the flap swings between the positions of FIGURES 3 and 5.

The rearward portion of the flap's leading edge 7 is not concentric with the flap pivot 4 so as to provide a depression 8 which can receive the trailing ends of dividers or partitions 9 in upright longitudinal planes constituting separators between adjacent channels 10. Approximately every fourth divider or rib incorporates the trailing edge guides 9' which recede into depressions in the flap when the flap is in the raised position shown in FIGURE 3. The trailing edge guide will bear on a closure strip 11 of resilient character to depress it below the surface of the flap. When the flap is swung into the deflected position shown in FIGURE 5, however, the inherent resiliency of the strip 11 will restore it into a position flush with the adjacent upper surface of the flap to cover the depression 8.

The ejectors include a series of nozzles 12a and 12b arranged in a row at the forward ends of the channels 10. Alternate nozzles of this series are connected to the two conduits 13a and 13b, respectively, having their lengths extending spanwise of the wing through the wing cavity 14. Thus the nozzles 12a connected to the aft conduit 13a are interdigitated with and located adjacent to the nozzles 12b connected to the forward conduit 13b. Even if the supply of air to one or the other of these conduits should be interrupted, therefore, the other conduit will supply air to alternate nozzles. Since, as shown best in FIGURE 6, one nozzle 12a and one nozzle 12b are located in each ejector channel 10 between adjacent dividers 9, an airflow will be produced in each channel by either the nozzles 12a or the nozzles 12b independently of the other nozzles.

Figure 6:
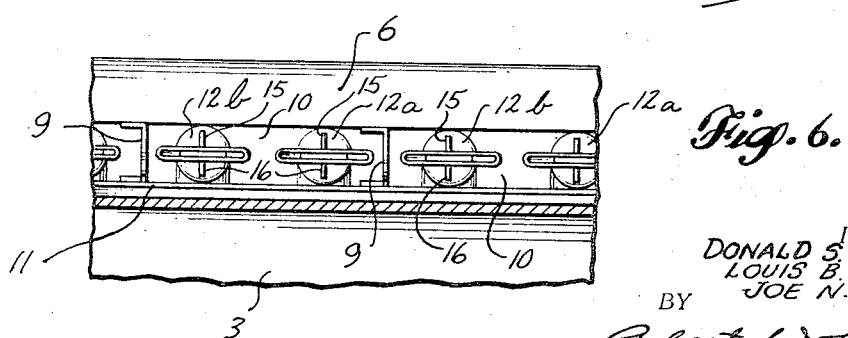
FIGURE 6 is a fragmentary detail section through a portion of the ejector installation taken on line 6—6 of FIGURE 3.

As also shown in FIGURE 6, the discharge tip of each nozzle 12a and 12b is elongated laterally and such elongated orifice is positioned substantially centrally between the top and bottom of the channel by lugs 15 on the upper sides of the nozzles and 16 on the lower sides of the nozzles which can engage the upper and lower walls, respectively, of the channel. The air jet discharged from each nozzle, therefore, will induce flow of air around it from the aft portion 17 of the wing cavity 14 into the ejector channel. The supplemental air thus induced to flow into the channel is supplied to the wing cavity through openings in the lower surface of the wing. One such opening 18 is located forward of the conduits 13a and 13b so that such air flows over the conduits and cools the parts in the wing cavity. Additional supplemental air can be supplied through a rear inlet between the flap 3 and the rear wall 22 of the cavity 14. Such air enters the rear portion 17 of the cavity through apertures 22a formed in such wall.

Figure 4:
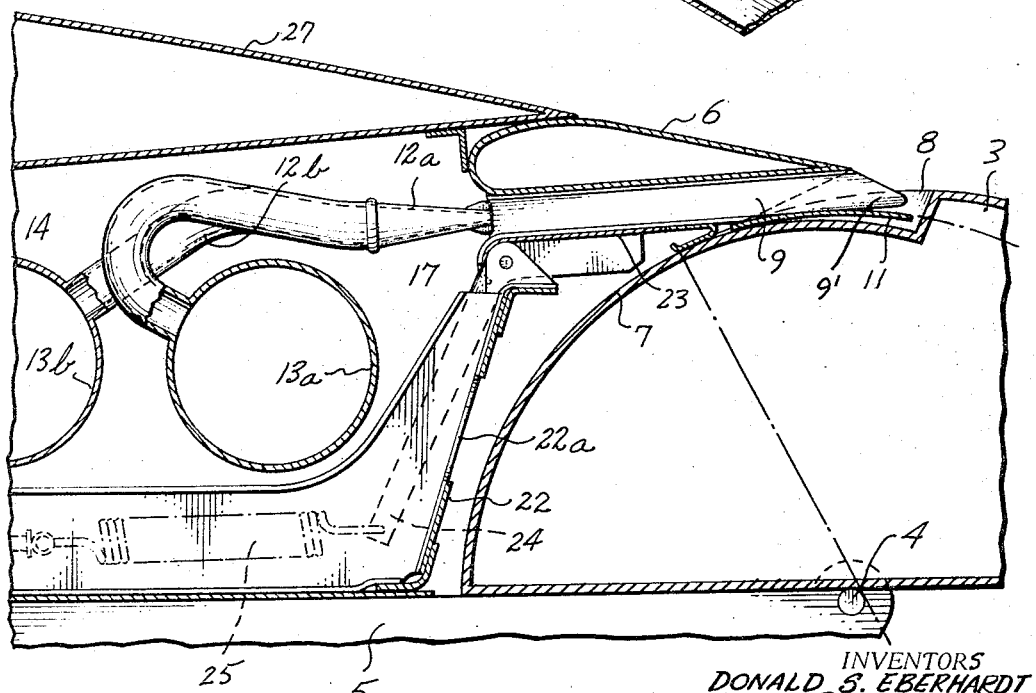
FIGURE 3 is a vertical longitudinal section through a portion of an airplane wing showing the ejector installation and FIGURE 4 is a similar section of part of the installation shown in FIGURE 3 on an enlarged scale.

When the flap is in the position of FIGURE 3 projecting rearwardly from the wing, which position it will assume during cruising flight, the forward air inlet will be closed by a door 19, as shown in FIGURE 3. The actuator 20, which may be a fluid-pressure jack of either the pneumatic or hydraulic type, normally will hold such door in the closed position of FIGURE 3, but, when the flap 3 is deflected to the position of FIGURE 5 and air is supplied to the ejectors through the conduits 13a and 13b, the actuator 20 will be operated to open the door 19. Also when the flap is in the position of FIGURE 3, its lower portion forward of the pivot 4 will virtually close the aft supplemental air intake 21. When the flap has been depressed to the position of FIGURE 5, a seal 23 carried by the channels 10 will engage the leading edge surface 7 of the flap to deter flow of air between the channels and the flap leading edge so that such air will pass through the apertures 22a of the wall 22 into the rear portion 17 of the wing cavity. To insure that the ejector assembly and the seal 23 remain in engagement with the leading edge 7 of the flap, such assembly can be pressed against the flap by pressure exerted on the channel by the lever 24 shown best in FIGURE 4 which is urged to swing in a clockwise direction by the force of tension spring 25 acting on it. One end of the spring is connected to the swinging end of lever 24 and the opposite end 26 is anchored to wing structure.

When the wing flap 3 is in the raised position of FIGURE 3, no air will be supplied to the nozzles 12a and 12b through the conduits 13a and 13b. When the flap is in the deflected position of FIGURE 5, however, the door 19 will open and supplemental air will be admitted to the ejector channels. Simultaneously, high pressure air from the engines is supplied to the conduits 13a and 13b and discharged through the nozzles 12a and 12b. The air from these nozzles will flow at a relatively high velocity, such as 2200 feet per second, whereas the air discharged from the ejector channels 10 will be at a much lower velocity, such as 900 to 1000 feet per second. The supplemental air induced to flow through the channels by the streams from the nozzles may be several times as great as the volume of air discharged from the nozzles themselves so that a much greater mass flow of air over the leading edge of the flap is produced by the ejectors than would be produced by the nozzles 12a and 12b alone. Such flow of air from the ejectors will be directed substantially tangentially to the leading edge surface of the flap, as shown in FIGURE 5.

While the use of such airflow over the leading edge of the flap is most important during landing, it can also be used during takeoff. Because of the increased wing lift produced by such ejector airflow, it is desirable to discontinue such airflow and to spoil the smooth flow of air over the flap immediately after touchdown of the airplane to increase braking effectiveness by increasing the load on the landing gear and enabling greater engine power to be made available for producing reverse thrust. Flow over the flap can be spoiled by a spoiler 27 swingable about pivots 28 carried by brackets 29 just forward of the flap. Action of the spoiler to control the lift of the flap over which the jet flows is accomplished by selecting properly the size of the spoiler and locating it so that its trailing edge is close to the point of discharge of the ejector onto the flap, but it should be spaced somewhat forwardly from the point of ejector discharge. The spoiler can be swung from the inoperative position of FIGURE 3 into the broken-line spoiling position of FIGURE 5 by a fluid-pressure jack 30 which may be either of the pneumatic or hydraulic type.

Figure 1:
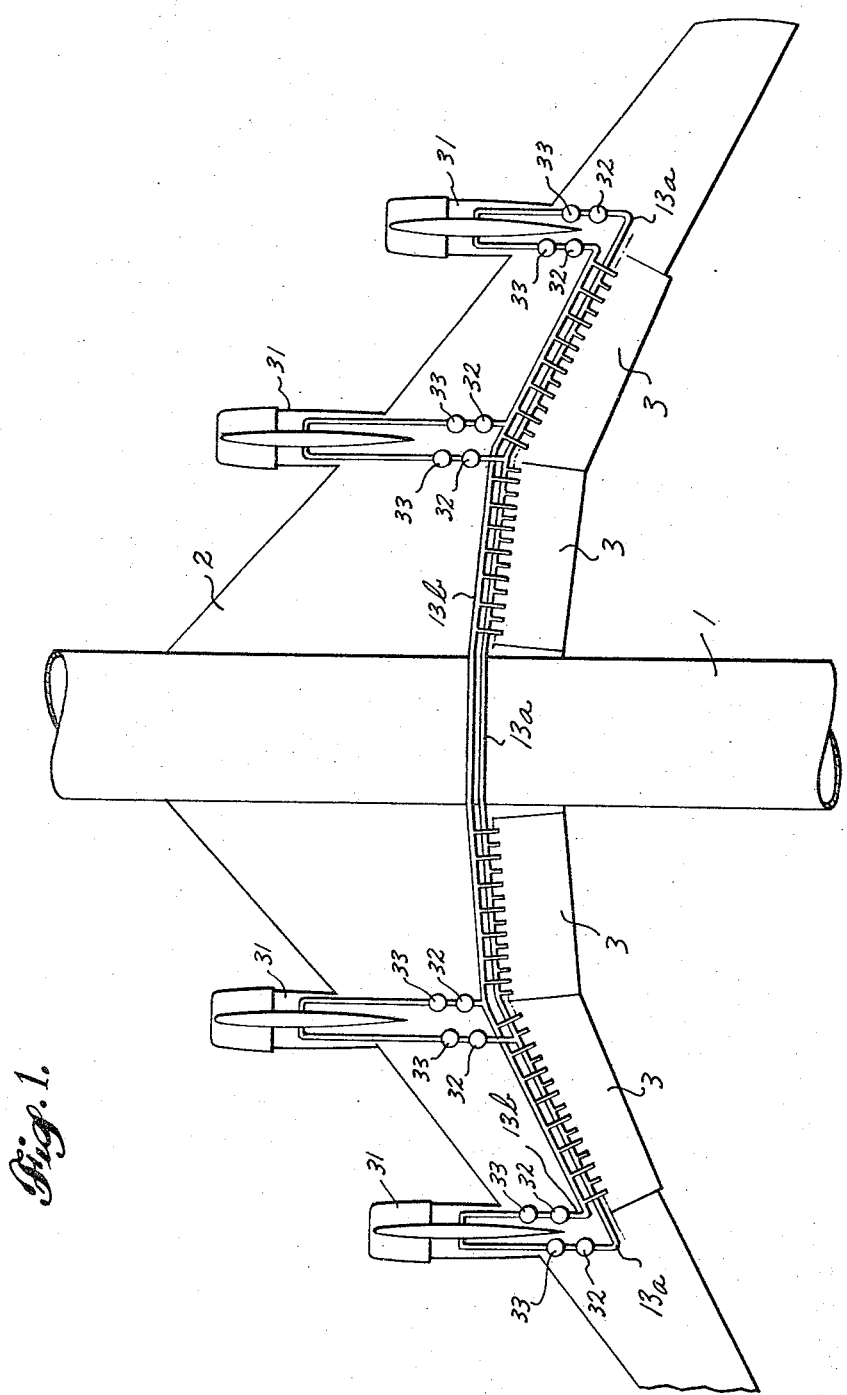
FIGURE 1 is a plan of a portion of an airplane showing the ejector installation somewhat diagrammatically.

A convenient source of supply of compressed air for the conduits 13a and 13b in an airplane having jet engines 31 is the compressors of such engines. In FIGURE 1 each engine 31 is shown as being connected to each of the conduits 13a and 13b. In each of these connecting conduits for each engine is located a check valve 32 so that if one of the engines is not operating compressed air cannot be supplied from the compressor of another engine through the conduits 13a and 13b to the compressor of the engine which is not operating. In addition a control valve 33 is provided in each of the compressed air supply lines connected to an engine, which valves are interconnected for conjoint operation to supply air simultaneously from all engines which are operating to both conduits 13a and 13b. These valves should be capable of being closed quickly so that immediately after the airplane has touched down all of these valves can be closed instantaneously to cut off the supply of compressed air to the conduits 13a and 13b at the same time that the spoiler 27 is swung from its solid line position of FIGURE 5 into its operative spoiling position shown in broken lines in that figure.

It will be evident that in order to supply a sufficient volume of compressed air to the conduits 13a and 13b from the engines 31 it may be necessary to operate these engines at a higher speed than would otherwise be necessary just prior to landing. Under these circumstances the thrust reversers for the engines can be manipulated so as to prevent or decrease the forward propulsive thrust to whatever extent is desired despite such higher-speed operation of the engines.

It will be appreciated that the spacing between the dividers 9, as shown in FIGURE 6, will be sufficiently small with respect to the widths of the nozzles 12a and 12b so that the discharge from the channels of the ejectors will produce a substantially continuous and uniform blanket along the leading edge of the flap. Such airflow will continue around the leading edge and over the upper surface of the flap even when it is swung into its farthest deflected position to maintain a smooth flow hugging the flap surface without separation so that a very effective lift force is produced on the entire wing.

We claim as our invention:

1. Flap jet-blanketing mechanism for an airplane wing trailing edge flap, comprising ejector means carried by the wing adjacent to the flap and including rearwardly directed channel means having a rear discharge end of a depth less than the thickness of the flap and overlying the leading portion of the flap and nozzles located to direct air jets into said channel means but spaced from the walls thereof to leave passages for flow into said channel means of supplemental air for discharge alongside the leading portion of the flap, and supplemental air supply means communicating with the underside of the wing for supplying supplemental air to said channel means from the underside of the wing.

2. The jet-blanketing mechanism defined in claim 1, in which the tip of each nozzle is flattened to form an orifice elongated laterally of the airplane.

3. The jet-blanketing mechanism defined in claim 1, and spacing lugs on the upper and lower sides of each nozzle engageable with the channel means for locating the nozzle tip opening elevationally substantially centrally of the channel means.

4. The jet-blanketing mechanism defined in claim 1, in which the supplemental air supply means includes an opening immediately forward of the flap, and sealing means carried by the ejector means and engaged with the leading portion of the flap for deterring passage of air between the wing and the leading edge of the flap bypassing the channel means.

5. The jet-blanketing mechanism defined in claim 4, movable means supporting the sealing means, and resilient means urging said movable means in a direction to press the sealing means against the flap's leading portion.

6. The jet-blanketing mechanism defined in claim 1, air supply means connected to the nozzles for supplying thereto air under pressure, spoiler means mounted on the wing forward of the flap, and spoiler-actuating means operable to actuate said spoiler means with simultaneous interruption of the supply of air to the nozzles by said air supply means for quelling the flap lift abruptly.

7. The jet-blanketing mechanism defined in claim 1, including two air supply conduits in the wing cavity, and means connecting said air supply conduits, respectively, to alternate ones of said nozzles.

8. The jet-blanketing mechanism defined in claim 7, and engine conduits connecting both of the air supply conduits to each engine of the airplane.

9. The jet-blanketing mechanism defined in claim 8, in which each engine conduit has in it a check valve preventing backflow of air from such conduit to the engine.

10. The jet-blanketing mechanism defined in claim 9, in which each engine conduit has in it control valves between the check valve and the engine.

11. The jet-blanketing mechanism defined in claim 7, in which the channel means is divided spanwise of the wing into sections and two nozzles are directed to project air into each ejector channel means section, one of such nozzles being connected to one of the air supply conduits and the other nozzle being connected to the other air supply conduit.

12. The jet-blanketing mechanism defined in claim 1, in which the ejector means includes upright walls spaced spanwise of the wing defining channel sections therebetween into which the nozzles are directed rearwardly.

13. The jet-blanketing mechanism defined in claim 1, and door means movable to close substantially the supplemental air supply means opening when the flap is in raised position.

14. The jet-blanketing mechanism defined in claim 1, in which the leading portion of the flap has a recess in its upper side to receive the channel means when the flap is in its raised position.

15. The jet-blanketing mechanism defined in claim 14, and resilient closure means movable automatically into a position spanning the recess in the upper side of the flap's leading portion when the flap is swung downward.

References Cited

UNITED STATES PATENTS

| 2,920,844 | 1/1960 | Marshall et al. | 244—42 |
| 2,969,206 | 1/1961 | Jensen | 244—42 |
| 3,055,614 | 9/1962 | Thompson | 244—42 |
| 3,154,267 | 10/1964 | Grant | 244—42 |
| 3,259,341 | 7/1966 | Steidl | 244—42 |

MILTON BUCHLER, *Primary Examiner.*

FERGUS S. MIDDLETON, *Examiner.*

B. BELKIN, *Assistant Examiner.*